Feb. 7, 1967  F. A. GUERTH  3,302,456
FORCE MEASURING APPARATUS
Filed Oct. 26, 1964  2 Sheets-Sheet 1

INVENTOR.
FRITZ A. GUERTH

Feb. 7, 1967  F. A. GUERTH  3,302,456
FORCE MEASURING APPARATUS
Filed Oct. 26, 1964  2 Sheets-Sheet 2

INVENTOR.
FRITZ A. GUERTH
BY
AGENT
ATTORNEY 3,302,456
FORCE MEASURING APPARATUS
Fritz A. Guerth, 1707 W. 27th St., South Shore,
San Pedro, Calif. 90732
Filed Oct. 26, 1964, Ser. No. 406,632
10 Claims. (Cl. 73—136)

The invention described herein may be manufactured and used by or for the Government of the United States of America for government purposes without the payment of any royalties thereon or therefor.

The present invention relates to the measurement of forces. In a preferred embodiment, it is based upon the change in permeability of a mass of ferromagnetic material to an induced electromagnetic flux when the material is subjected to an externally-applied stress.

It is known that the magnetic properties of most ferromagnetic substances undergo a change when a stress is applied thereto. This change in permeability is such that, in some cases, the magnetization increases with an increase in tension and the material expands when magnetized. Substances in this catagory are stated to possess positive magnetostriction. Another class of materials have their magnetization decreased with tension so that the material contracts when magnetized. This class of substances is stated to possess negative magnetostriction. One example of the former is Permalloy, which possesses a relatively high strain sensitivity, so that, when stress is present, there is a rapid rise of induction with field strength up to the saturation value of the material. On the other hand, an example of a substance in which the permeability decreases with tension is nickel, the latter consequently possessing negative magnetostriction. The general effect of tension on a mass of material such as Permalloy is to effectively change the hysteresis loop in such a manner that the sides thereof become essentially vertical, so that the material saturates and desaturates with extreme rapidity.

While this marked increase in permeability of a material possessing magnetostrictive properties is known, applicant has found that, when a cyclically-varying voltage is applied thereto, a time variation is produced in the instants at which the material changes from one condition to another, and that this time variation is directly proportional to the amount of tension applied to the material. In other words, not only is the permeability of the substance raised to correspondingly increase the *amplitude* of output pulses respectively generated during saturation and desaturation, but at the same time development of these pulses is shifted time-wise with respect to the corresponding instants at which output pulses would be developed from a mass of material which is not subjected to an external force.

It is believed that the basic principle upon which the change in pulse displacement is founded is that the material's molecular structure changes to force the induced flux to follow a different path, and, if this path is of a length longer then the path which the flux followed when the material was unstressed, then a variation will occur in the time period required to completely saturate the body. Such a phenomenon is somewhat analogous to the action of a current in passing through a circuit in which there are a number of parallel paths each of which exhibits a different amount of resistance. Under such circumstances, the current will tend to flow along that particular path having the lowest resistance, and will divide in accordance with well-known laws of electrical transmission. In so dividing, the major portion of the current may be forced to travel along a path which is greater in length then the most direct route between the input and output terminals. Consequently the time required for the current to reach the output terminal will increase with respect to that which would have been necessary had the current followed a direct line between the two points.

The above-discussed nature of a mas of ferromagnetic material under conditions of stress may be utilized in deriving information regarding the operational characteristics of some device in which a force is developed between a driving and a driven member. Such conditions may exist, for example, in power-transmitting apparatus the dynamic operating aspects of which are required to be known. At the present time, various forms of strain gauges are available, which generally embody a conductor the electrical resistance of which varies as a function of an applied mechanical stress. While such devices are in extensive use, their output is extremely low under ordinary operating conditions, and hence considerable amplification is necessary before the data can be utilized. Furthermore, their accuracy is such that the results obtained cannot always be relied upon.

As brought out above, the present concept is based upon variations in the permeability of a ferromagnetic member when an external force is applied thereto. Depending upon the type of material to which this force is applied, its permeability may increase with tensile stressing (positive magnetostriction) or its permeability may decrease with tensile stressing (negative magnetostriction). In a preferred embodiment, the present concept has as an underlying principle the recognition that when a flux is induced in a body of ferromagnetic material, this flux will flow along a path determined by the amount and type of external force applied to the body. If more than one path is available for the flux, it will tend to select that particular direction which offers the least resistance to its flow. Expressed differently, it has been ascertained that the flow of an induced flux under conditions such as mentioned above may be directionally varied as a function of tensile stresses applied to the material. Inasmuch as the saturation factor of a body of ferromagnetic material is dependent upon the magnitude of the current which creates the flux therein, no saturation can take place until the reluctance of the material is overcome. Since the hysteresis loop of any body of a magnetic nature is representative of this flux flow, any output pulse from an associated circuit represents the time derivative of this change in magnetic flux, and hence will occur at times when the flux flow is at a maximum. This takes place at points when the flux flow is passing through zero, and, for practical purposes, coincides with the relatively vertical portions of the hysteresis loop.

It will now be appreciated that by changing the length of the path which the induced flux must follow in saturating the magnetic body, the sides of this hysteresis loop may be effectively shifted time-wise, and the magnitude of this shift has been found to be directionally proportional to the amount of stress applied to the member. Consequently, apparatus may be provided for depicting pulses representing the times of saturation and desaturation of the body as related to other instants of time at which output voltage variations are developed from the same body under unstressed conditions. The amount of this time displacement will be indicative of the amount of applied force.

One object of the present invention, therefore, is to provide an improved means for determining the magnitude of an applied force.

A further object of the invention is to provide a device which utilizes changes in the properties of a mass of ferromagnetic material under varying degrees of stress to thereby yield a measurement of the amount of such stress at any particular instant of time.

An additional object of the invention is to provide an improved magnetic torque meter designed to provide an indication of the forces existing between a driving member and a driven member.

A still further object of the invention is to provide an improved form of device for measuring external forces, such device incorporating a plurality of ferromagnetic members having different magnetostrictive properties.

Other objects, advantages, and novel features of the invention will become apparent from the following detailed description of the invention when considered in conjunction with the accompanying drawings wherein.

Figure 1:
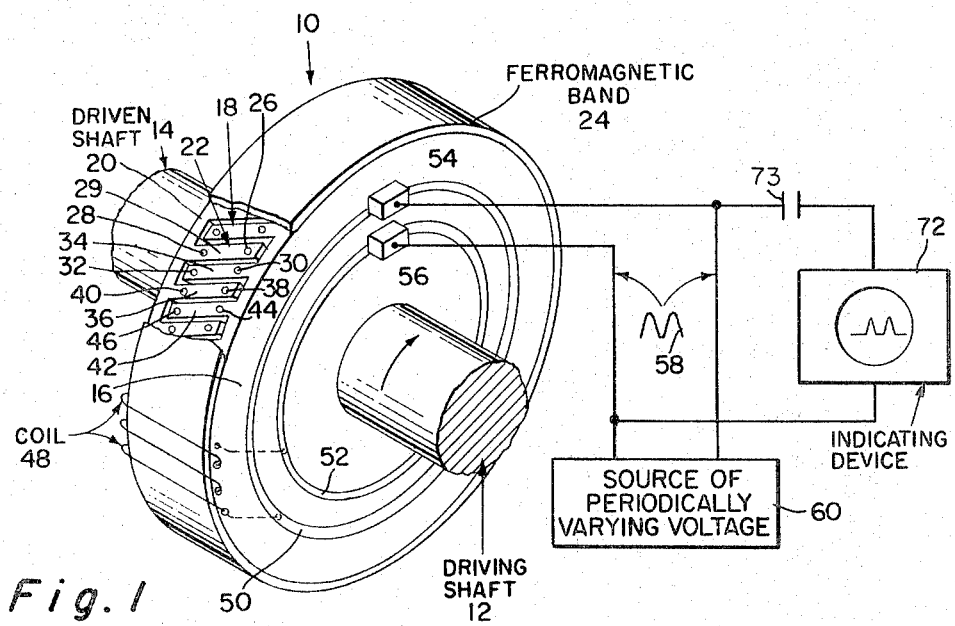
FIG. 1 is an isometric view of a preferred form of force-measuring device designed in accordance with the principles of the present invention.
Figure 7:
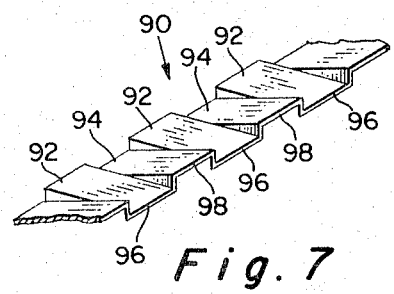
Figure 8:
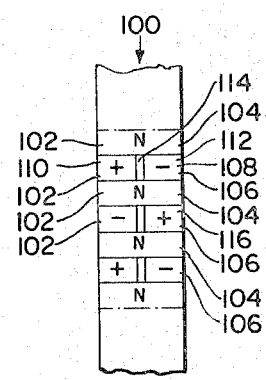

FIG. 7 is a perspective view of a modification of that portion of FIG. 1 which constitutes the material having ferromagnetic properties; and FIG. 8 is a schematic view of a further modification of the device of FIG. 1 in which a band of ferromagnetic material having individual regions exhibiting different magnetostrictive properties is substituted for the homogeneous band of the latter figure, thus avoiding the necessity for employing meshing teeth on the clutch-like members.

Figure 2:
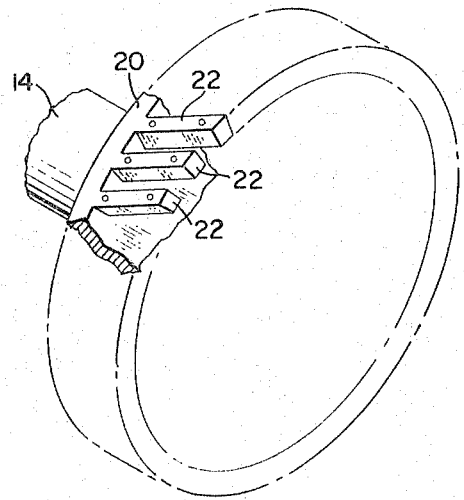
FIG. 2 is an isometric view of one of the components of the device of FIG. 1, showing in greater detail the configuration thereof.

Referring first to FIGS. 1 and 2 of the drawings, there is shown a torque-measuring device constructed in accordance with a preferred embodiment of the present invention. This torque-measuring device, generally identified by the reference numeral 10, is interposed between a driving shaft 12 and a driven shaft 14 which is mounted coaxially therewith, and is employed to measure the amount of torque developed between the respective shafts 12 and 14 when a rotational force is applied to the former. To achieve this objectice, the unit 10 includes a disc-shaped clutch-like member 16 securely mounted on the driving shaft 12, this member 16 being formed with a plurality of circumferentially-spaced teeth 18 extending parallel to one another and at an angle to the axis of rotation of the driving shaft 12 upon which the member 16 is mounted. The latter is composed of some suitable non-magnetic material, the reason for which will hereinafter become apparent.

Mounted on the driven shaft 14 is a second disc-shaped clutch-like member 20 (see FIG. 2) disposed in face-to-face relation with the first-mentioned clutch member 16, this further clutch-like member 20 also having a plurality of parallel circumferentially-spaced teeth 22, the material of which the member 20 is composed being preferably similar to that of the disc 16. The two clutch-like members 16 and 20 are so disposed upon their respective shafts that the teeth 18 mesh with the teeth 22, but the surfaces thereof are not urged toward contact with one another until a rotational force is applied to the driving shaft 12. In other words, in the absence of such a rotational force, the two sets of teeth 18 and 22 are intended to lie in spaced-apart relationship in the manner brought out by FIG. 1 of the drawing. Consequently, a limited amount of angular displacement can take place between the discs 16 and 20 before the two sets of teeth 18 and 22 come into contact with one another.

Overlying the periphery of the meshed teeth 18 and 22 is a single band 24 composed of some suitable ferromagnetic material, such for example as Permalloy. This band 24 is of sufficient width to cover the teeth 18 and 22 and is of substantially uniform thickness. It is intended to lie in close contact with the respective teeth of the discs 16 and 20 and, as brought out in the drawing, the band is securely affixed to each one of the teeth 18 and 22 at two laterally-separated points. This attachment of the band to the teeth may be carried out in any suitable fashion after the parts have been assembled, one preferred method being by spot-welding. The two points at which the band is attached to a particular one 29 of the teeth 22 are respectively identified in FIG. 1 of the drawings by the reference numerals 26 and 28, while the corresponding points at which the band 24 is attached to an immediately adjacent one 34 of the teeth 18 are similarly identified by the reference numerals 30 and 32, respectively. The next succeeding one 36 of the teeth 22 carried by the disc 20 is attached to the band 24 at the points 38 and 40, while, in similar fashion, the next succeeding one 42 of the teeth 18 carried by the disc 16 is attached to the band 24 at the points 44 and 46, respectively. Although it will be recognized from the preceding discussion that the band 24 is not attached to teeth 18 and 22 until it has been positioned around the periphery of the meshed discs 16 and 20, nevertheless the various points of attachment have been illustrated in FIGS. 1 and 2 even though the band 24 has been partly broken away in order to show the relative position of the teeth before portions of the band are subjected to torsional and compressional stresses upon the application of a rotational force to the driving shaft 12. This change in status of the components will be made clear during a description of FIGS. 3, 4, 5 and 6 of the drawings, to be set forth below.

FIG. 2 has been included to illustrate in detail the configuration of one of the disc-shaped clutch-like members of FIG. 1. As brought out in FIG. 2, the respective teeth 22 of the member 20 do not lie parallel to the axis of rotation of the driven shaft 14, but instead extend at an angle thereto. This angle is not critical, but should be sufficient to create an alternate stressing and compression of adjacent portions of the material of which the band 24 is composed when the assembly is subjected to a torsional force. This will be brought out in greater detail hereinafter.

In order that the disclosed device operate to yield the desired results, it is necessary that an electromagnetic flux be induced in the material of which the band 24 is composed, and that this induced flux completely saturate the band. To bring this about, there is provided a coil 48 which is so wound as to encircle a portion of the band in the manner illustrated. The terminals of the coil 48 are respectively connected to a pair of slip rings 50 and 52 which are embedded or otherwise carried upon the surface of the disc 16. These rings 50 and 52 constitute a portion of a commutating device which further comprises stationary brushes 54 and 56. The various portions of this commutator are illustrated somewhat schematically in FIG. 1 inasmuch as their physical arrangement is well known in the art and since in addition the details thereof form no part of the present invention. It is only necessary to recognize that a periodically varying voltage (designated by the reference numeral 58) is applied to the brushes 54 and 56 from a suitable source 60. In consequence thereof, the coil 48 develops therearound a cyclically-varying field of flux, and, since the band 24 passes through this field, a flux flow is induced in the band. As will later appear, the coil 48 and the slip rings 50 and 52 also constitute part of an output circuit by means of which changes in the magnitude of the flux field surrounding the coil 48 (produced by changes in the flux flowing in band 24) are transmitted to some suitable indicator or recorder.

It is well known in the art to which this invention relates that a mass of ferromagnetic material, which is subjected to a varying electromagnetic field, periodically saturates and destaturates according to the hysteresis loop of the particular material in question. Furthermore, a surge or pluse of energy is developed in an output circuit when the energizing voltage rises to a certain predetermined level, and again when this voltage reaches the same level during the latter part of the same cycle. This condition is somewhat schematically illustrated in FIG. 3 of the drawing, in which the varying voltage output 58 of the source 60 is depicted as developing an output pulse 62 when the energizing voltage 58 flowing in coil 48 reaches a certain level of magnitude. The level is designated by the reference numeral 64. A second pulse 68 is developed when the energizing voltage 58 reaches a comparable level. the energizing voltage 58 reaches a comparable level in a negative direction of polarity. However, it is only with the pulse 62 that the present invention is particularly concerned.

The above discussion has assumed a condition for the apparatus of FIG. 1 in which there is no rotational force applied to the driving shaft 12. In other words, the separation between the teeth 18 and 22 is as shown in the drawing. The band 24 consequently is completely unstressed, and the electromagnetic flux induced therein by passage of the energizing voltage 58 through the coil 48 flows in an essentially straight circumferential path around the periphery of the band 24 in the manner brought out by the arrows 71 in FIG. 4. In other words, the flux thus flowing in the band 24 follows the shortest possible path to produce complete saturation of the ferromagnetic material of which the band is composed. It is important to recognize that in this "unstressed" condition of the band 24, the points 26, 30, 38 and 44 (for example) are equally spaced from one another in a circumferential sense, as are the corresponding points 28, 32, 40 and 46 which are located on the opposite side of the band. This condition, when the band 24 is unstressed and the points of attachment of the band to the respective teeth of members 16 and 20 are equally spaced, is one that is present when the two shafts 12 and 14 have relative positions as shown in FIG. 1 of the drawings.

Figure 3:
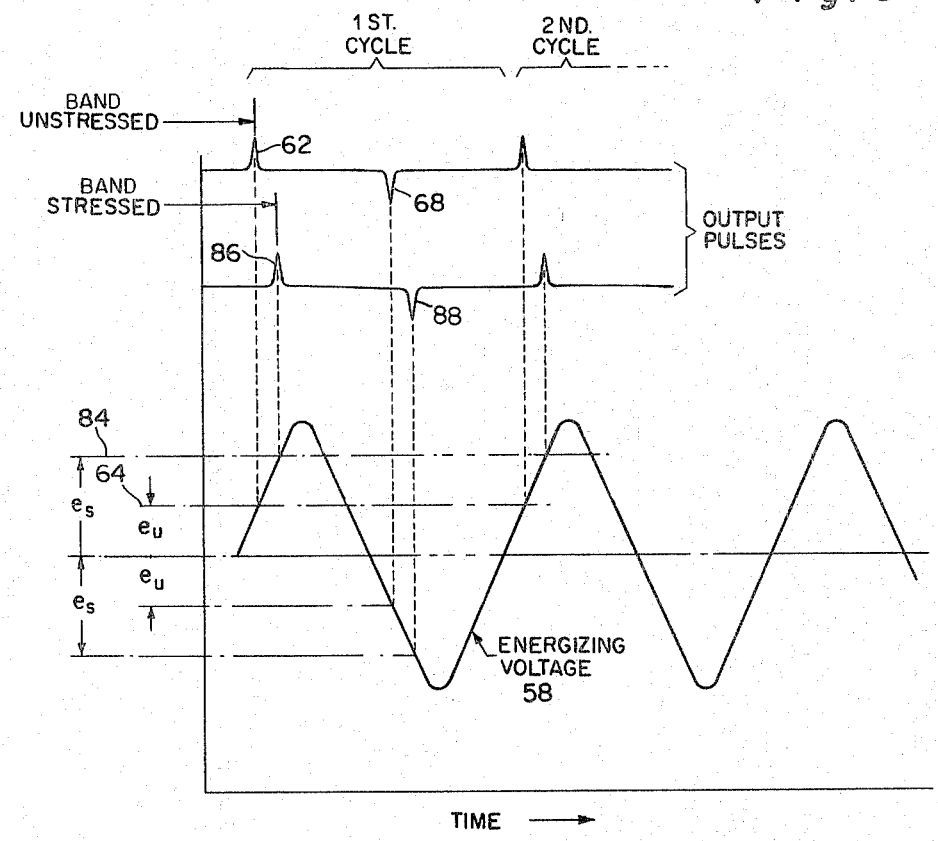
FIG. 3 is a graph showing the time displacement which may occur in an output voltage developed by the device of FIG. 1 when such device is subjected to an external stress.

Summarizing the above, therefore, in the absence of an applied torque between the driving and driven shafts of FIG. 1, energization of the coil 48 from source 60 will develop on an indicating device 72 a positive pulse such as represented by the reference numeral 62 in FIG. 3. A capacitor 73 of suitable value is connected as shown in the drawing to prevent the sine wave voltage 58 developed by source 60 from appearing on the indicating device 72. The position of such pulse may be readily measured on any suitable form of time base. Of course, if desired, the pulse 62 may be recorded on some sensitized medium for future evaluation.

In accordance with the present concept, a variation in the position of the pulse 62 has been found to be indicative of the presence of a rotational force applied to the driving shaft 12 of FIG. 1, and, furthermore, it has been ascertained that the amount by which the pulse 62 varies timewise is a direct function of the magnitude of this rotational force. The particular manner in which this displacement of the pulse 62 is brought about is illustrated in FIGS. 5 and 6 of the drawing, and a brief description thereof will now be set forth.

It has been stated above that the properties of a ferromagnetic material undergo a change when a stress is applied thereto. In many cases, the magnetization of the material is increased with tension. In order to utilize this characteristic possessed by the material of which the band 24 of FIG. 1 is composed, certain portions of this band are placed in a condition of stress while other portions of the band are acted upon in an opposite sense— in other words, instead of being stretched they are subjected to a compressional force. The manner in which this condition is brought about is schematically shown in FIG. 5 of the drawing.

It will be recalled that the respective teeth 22 of the clutch-like member 20 are spaced apart from adjacent teeth 18 of the clutch-like member 16 in the absence of any torque or other rotational force applied to the driving shaft 12. If such a force is now applied, and assuming that this force is in the direction indicated by the arrow in FIG. 1, one side of each of the teeth 18 will be brought into closer relationship with one side of each of the corresponding teeth 22. This action will *decrease* the spacing between a particular tooth (such as 34) of one set and a particular tooth (such as 29) of the remaining set. At the same time, it will *increase* the spacing between this same tooth 34 and the tooth 36 which lies on the opposite side thereof from the tooth 29. The same change in tooth spacing will occur regularly around the periphery of the two meshed members 16 and 20.

Figures 4, 5, 6:
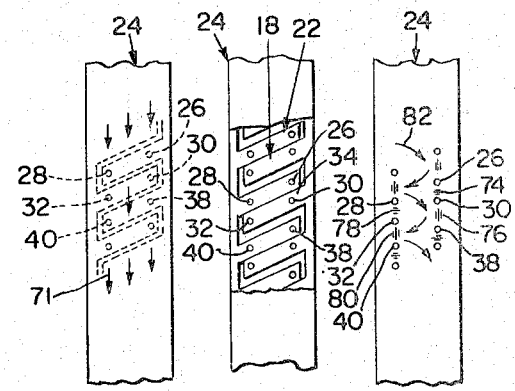
FIG. 4 is a schematic view of a portion of the device of FIG. 1 showing the path which an induced flux will follow in the ferromagnetic member when the device is in an unstressed condition.
FIG. 5 is a view of FIG. 4, partly broken away, after an angular displacement has occurred between the members 16 and 20 of FIG. 1.
FIG. 6 is a view similar to FIG. 4 but showing representative paths which the induced flux may follow when a stress is applied to the ferromagnetic member as a result of torque being developed between the driving and driven shafts of FIG. 1 to displace the teeth 18 and 22 as in FIG. 5.

Reference to FIG. 5 will show the effect of such a relative displacement between the two sets of teeth 18 and 22. In shifting their relative positions, the teeth 18 and 22 impose a condition of stress upon certain portions of the band 24, and upon other portions of the band they assert a compressional force. This will be clear when it is noted that the point 26, representing the location at which the band 24 is attached to the tooth 29, is now separated from the point 30 on tooth 34 by a lesser distance then was the case in FIG. 4. Inasmuch as this distance between the points 26 and 30 has decreased, the band portion in this region must undergo compression, inasmuch as the band is securely held in position by being welded to the teeth 18 and 22 so that it is not free to move in a circumferential direction.

While the above action is taking place, the points 30 and 38 at which the band 24 is secured to the teeth 34 and 36, respectively, are now separated by a greater distance then was the case in the unstressed representation of FIG. 4. This means that the material of the band 24 has been stressed in this particular region. The same condition of alternate stressing and compression in also occurring on the left-hand side of the band 24 (as viewed in FIGS. 4 through 6 of the drawing) but since the teeth 18 and 22 are angularly disposed with respect to the axis of rotation of the driving shaft 12 and the driven shaft 14, the corresponding areas of compression, for example, will not be aligned in lateral fashion around the periphery of the discs, but instead these stressed areas will be circumferentially offset, so that, as viewed for example in FIG. 5 of the drawing, the stressed band regions to the left of the band will be vertically displaced from the corresponding stressed region to the right of the band.

The positional relationship of the stressed and compressed regions of the band 24 under the conditions assumed in FIG. 5 is brought out schematically in FIG. 6. In this view, the stressed portions of the band 24 are represented by a series of lines running circumferentially of the band (vertically in the drawing) while the compressed portions thereof are represented by a series of laterally-disposed lines (horizontal in the drawing). For example, the band region 74 lying between the points 26 and 30 is compressed by virtue of the angular displacement of the two members 16 and 20, tending to bring the teeth 29 and 34 into closer physical relationship. While this occurs, the distance between the points 30 and 38 increases due to the greater separation which is brought about between the teeth 34 and 36. Consequently, the band region 76 is stressed. On the other side of the band, the region 78 lying between the points 28 and 32 is compressed, while the region 80 between the points 32 and 40 is placed under tension.

Since the electromagnet flux flowing in the band 24 tends, as above brought out, to favor regions of the band 24 under tension and to avoid those regions of the band which have been compressed, such flux will follow a "meandering" path through the regions 76 and 80 (for example) and will avoid the regions 74 and 78. This "back and forth" path of the flux is represented by the arrows 82 in FIG. 6, and it will be noted that this flow of flux has a component transverse or laterally related to the original direction of the flux flowing through the unstressed band material, as brought out in FIG. 4. In traveling over the path shown by the arrows in FIG. 6, the flux requires a different time period to completely saturate the material of which the band is composed. Furthermore, this time period is dependent upon the magnitude of the flux necessary to bring about the condition of saturation. In an unstressed mass of ferromagnetic material, less energy is required to complete the condition of saturation, and, as shown in FIG. 3 of the drawings, the required energy $e_u$ to produce this condition is indicated by the threshold level 64. When the band 24 is in a condition such as brought out in FIGS. 5 and 6, however, the magnitude of the energizing voltage $e_s$ required to saturate the ferromagnetic material is greater, and reaches a threshold level 84 which, as shown in FIG. 3, is of increased amplitude insofar as the energizing voltage 58 is concerned. Since this latter voltage varies in a cyclic manner, the instants at which saturation of the band 24 occurs are time-displaced with respect to the corresponding instants at which the band saturated when it was unstressed. Reference to FIG. 3 will bring out that the pulses 62 and 68 originally generated when the energizing voltage 58 reached the saturation level 64 have now been time displaced to new locations 86 and 88, and that the time position thereof is different from that which existed for the pulses 62 and 68. The amount of this change in position is a direct function of the torque applied to the driving shaft 12 of FIG. 1, and this change in pulse position may, as above stated, be observed upon the indicating device 72 or otherwise recorded for subsequent evaluation.

In the embodiment of applicant's invention illustrated in FIGS. 1, 2, 4, 5 and 6 of the drawings, the ferromagnetic material of which the band 24 is composed was assumed to be essentially homogeneous in nature. That is, it was assumed to possess generally uniform magnetostrictive properties throughout. Consequently, the respective stressing and compressing of individual sections of this material is effective to bring about the change in direction of flux flow when the driving and driven shafts of FIG. 1 have a torsional force existing therebetween. However, under certain conditions, it is possible to obtain somewhat similar results without utilizing the specific construction of FIG. 1, and without employing a pair of members having sets of teeth arranged in meshing fashion. One possible expedient by which many of these constructional details of FIG. 1 can be dispensed with is shown in FIG. 7 of the drawings, and a brief description thereof will now be given.

Whereas in the embodiment of FIG. 1 a pair of clutch-like members are utilized each of which possesses a plurality of circumferentially-spaced teeth, it has been found that this somewhat complex construction can be dispensed with by utilizing a ferromagnetic band which is not of uniform configuration, but instead possesses the corrugated shape illustrated in FIG. 7 of the drawings. Such a band, generally identified by the reference numeral 90, is made up of a first plurality of planar sections 92 spaced apart from one another, between adjacent ones of which respectively lie a further plurality of planar regions 94. Before proceeding further with a description of the arrangement of FIG. 7, it should be mentioned that, although the band 90 when integrated into a torque-measuring device will possess an annular outline, nevertheless in FIG. 7 this band 90 has been illustrated as being "flattened out" in order to better show the interrelationship of the respective planar regions 92 and 94. It will consequently be understood that the band 90 of FIG. 7 is intended to encircle two disc-like members (such as 16 and 20 of FIG. 1) in a manner similar to that of the band 24, and is likewise attached at a plurality of points to each of these members. However, when the band 90 of FIG. 7 is employed, the two sets of teeth 18 and 22 are unnecessary and hence the overall construction of the device is simplified.

When the corrugated band 90 of FIG. 7 is substituted for the band 24 of FIG. 1, certain portions of the former are subjected to a greater stress than are other portions. This results from the corrugated nature of the band, since, as brought out in FIG. 7, the planar sections 92 each lie at an angle with respect to the axis of rotation of the discs upon which the band is carried. The band portions 94 are so aligned that their respective planes lie at a different angle with respect to the axis of rotation of the discs than that formed by the planar sections 92. Consequently, when the band 90 is in a position where it encircles the periphery of the discs 16 and 20, the inwardly-projecting edges 96 of the planar regions 92 lie at a different radial distance from the axis of rotation of the discs than do the outwardly-projecting edges 98 of the respective planar regions 94. As a result, each of the edges 96 is relatively compressed with respect to each of the edges 98, and hence there is developed around the band a series of alternately-appearing regions of compression and tension in the ferromagnetic material of which the band 90 is composed. This establishes a condition similar to that illustrated in FIG. 6, and this condition varies in magnitude as a direct function of the rotational force applied to the driving shaft 12 of FIG. 1. The results yielded by utilizing the arrangement of FIG. 7 are thus comparable to those obtained in the example previously described.

One preferred method of fabricating a band such as shown in FIG. 7 is to utilize a base member composed of some non-magnetic material such as plastic (which can be pre-formed or molded in the particular corrugated configuration desired) and then to coat this plastic strip with a thin film of the desired ferromagnetic substance, such film being applied by some suitable method such as electrodeposition.

In the embodiments described above, the underlying principle upon which their operation is based includes the development within the ferromagnetic material of individual regions under tension, these regions alternating with other individual regions which have been placed in a state of compression, so that the path of the electromagnetic flux in flowing through the material will be non-linear in nature and hence require a time period to completely saturate the band which is different from the time period required when the material is free of any externally-applied force. In each of the described embodiments, the ferromagnetic material was homogeneous in nature, or, in other words, of uniform magnetostrictive characteristics throughout. The basic concept herein disclosed, however, is capable of being carried out through the utilization of a mass of ferromagnetic material which, rather than being of a single type, may be made up of different portions respectively exhibiting positive, negative and neutral magnetostrictive characteristics. One preferred manner of placing such a concept into effect is shown in FIG. 8 of the drawings, which illustrates a band 100 which has the same physical configuration as the band 24 of FIG. 1 but is composed of a plurality of separate areas or regions which are interrelated in a particular manner now to be described.

Inasmuch as it is necessary for the induced flux to follow a circuitous path through the ferromagnetic material when the band 100 is placed under tension, the latter is preferably fabricated by depositing thin films of different types of ferromagnetic material on a plastic or other non-magnetic base. Initially, the band 100 is divided into a plurality of segments 102 lying side-by-side in circumferential fashion, and being contiguous with one another along lines which extend parallel to the axis of rotation of the discs upon which the band 100 is carried. Alternate ones 104 of these segments 102 are composed of ferromagnetic material having neutral magnetostrictive properties. Between each of these segments 104 lies a further one 106 of the segments 102, each segment 106 being made up of three individual regions which lie side-by-side in a transverse direction, or, in other words, parallel to the axis of rotation of the discs. Selecting any one of the segments 106 (such as the one identified in the drawing by the reference numeral 108) it will be noted that this particular segment is made up of a region 110 composed of positive ferromagnetic material and a region 112 which possesses negative magnetostrictive properties, these two regions 110 and 112 being separated laterally from one another by a further region 114 which possesses neutral magnetostrictive properties. This segment 10 is separated from the next succeeding one 116 of the segments 106 by a neutral segment 104.

In order to bring about the circuitous flow of flux in the band 100 under conditions of tension, the segment 116 (for example) is arranged so that the individual portions thereof are reversed with respect to its adjacent segment 108 of like characteristics. In other words, as viewed in FIG. 8 of the drawings, the order of the particular magnetostrictive regions in segment 108 appears as positive, neutral and negative, while in segment 116 the order appears as negative, neutral and positive. Consequently, the flux, in flowing through the stressed band, will follow the same "meandering" path that is shown in FIG. 6 of the drawings. The thickness of the ferromagnetic material employed in the arrangement of FIG. 8 need only be sufficient to produce a discernible output pulse on the indicator 72 of FIG. 1, and consequently can also be laid down by electrodeposition. Although in the arrangement of FIG. 8 the torsional stress developed along each edge of the band 100 is essentially the same over the entire periphery of the disc of FIG. 1, the fact that different circumferential regions of the band 100 are composed of material having opposite magnetostrictive properties produces a result similar to that developed by creating alternate areas of tension and compression in the structure of FIG. 1. In each case, however, the condition as "seen" by the flux is identical, and the tendency of the flux to select the path of least resistance is the same.

Obviously many modifications and variations of the present invention are possible in the light of the above teachings. It is therefore to be understood that within the scope of the appended claims the invention may be practiced otherwise than as specifically described.

I claim:

1. In a device for measuring the torsional force between a driving shaft and a driven shaft mounted in coaxial relationship thereto, the combination of:
    a first disc-shaped clutch-like member mounted on said driving shaft and having a plurality of circumferentially-spaced teeth extending parallel to one another and at an angle to the axis of rotation of said shaft;
    a second disc-shaped clutch-like member mounted on said driven shaft in face-to-face relation with said first clutch member, said second clutch member also having a plurality of parallel circumferentiall-spaced teeth and being designed to engage said first clutch member so that the respective sets of teeth on the two members mesh but lie in spaced-apart relationship to one another in the absence of a rotational force applied to said driving shaft; and
    a band of ferromagnetic material overlying the periphery of the two meshed clutch members, said band being secured to each of the teeth of each clutch member so as to be free of stress in the absence of a rotational force applied to said driving shaft;
    whereby, upon the application to said driving shaft of a force tending to rotate the latter, the teeth on said first clutch member will be urged toward contact with the teeth on said second clutch member, thus placing individual portions of the material of which said band is composed under tension and other individual portions of said band material in a state of compression, the band portions so compressed alternating in any selected circumferential direction with the band portions placed under tension.

2. The combination of claim 1 in which the ferromagnetic material of which said band is composed is homogeneous in nature.

3. The combination of claim 1, further comprising means for inducing a cyclically-varying electromagnetic flux flow in said band of ferromagnetic material, said flux being of sufficient magnitude to bring about a condition of periodic saturation of said band.

4. The combination of claim 3 in which said flux-inducing means comprises:
    a coil encircling said band;
    a source of periodically-varying energy; and
    means for conducting energy from said source to said coil.

5. The combination of claim 3, further comprising:
    means for yielding an indication of the respective time instants at which electromagnetic flux flowing in said band periodically saturates the latter, and also the corresponding time instants at which said band is periodically de-saturated.

6. In a torque meter:
    a driving shaft having thereon a first member the periphery of which is of annular configuration;
    a driven shaft having thereon a second member the periphery of which is also of annular configuration, said two members being spaced-apart but lying in face-to-face relationship with one another;
    a single band of ferromagnetic material encircling said two members in circumferential fashion and being secured at a plurality of points to the periphery of each member;
    electrically-energizable means for developing an electromagnetic field of flux in a region through which said band passes, said electromagnetic flux tending to saturate said band when the amplitude of the energy applied to said means, and hence the magnitude of the flux field developed thereby, reaches a given level;
    so that, upon the application of a rotational force to said driving shaft, an angular displacement will be brought about between said two members to thereby create a torsional stress in selected portions of said band and hence affect the permeability of such selected portions to said electromagnetic flux;
    said band thus becoming saturated when the magnitude of the flux field developed as a result of the energization of said means reaches a given level different from the level at which said band saturates in the absence of a rotational force applied to said driving shaft.

7. In combination:
    a driving member;
    a driven member;
    a mass of ferromagnetic material connecting said two members so that such mass is subjected to a torsional stress when a rotational force is applied to said driving member;
    means for creating a cyclically-varying field of flux in the vicinity of said mass of ferromagnetic material of such a maximum amplitude that said material reaches a condition of saturation in a given period of time during each flux cycle; and means for producing a torsional stress in said mass of ferromagnetic material upon an angular movement of said driving member relative to said driven member;

whereby said mass of ferromagnetic material reaches a condition of saturation during each flux cycle in a period of time different from that required for the material to reach saturation when no such torsional stress is present therein;

the time duration of each such period being a function of the magnitude of the torsional stress produced in said mass of material by said last-mentioned means;

said driving member being in the form of a first rotatable disc;

said driven member being in the form of a second rotatable disc mounted coaxially with said first disc and in spaced-apart face-to-face relation therewith; and said mass of ferromagnetic material being in the form of a single corrugated band encircling both said discs and attached at a plurality of points to the respective peripheries thereof;

said corrugated band being made up in part of a first plurality of planer regions lying at an angle to the axis of rotation of said discs;

said first plurality of planar regions being spaced apart circumferentially of said discs;

said corrugated band also including a further plurality of planar regions alternating with said first plurality of planar regions;

said further plurality of planar regions lying at an angle to the axis of rotation of said discs which is different from the angle made with such axis by the said first plurality of planer regions.

8. The combination of claim 7 in which the plurality of planar regions making up said corrugated band are composed of ferromagnetic material respectively possessing positive, negative and neutral magnetostrictive properties.

9. The combination of claim 8 in which the planar regions of said band are in the form of ferromagnetic segments lying side-by-side in circumferential fashion and being contiguous with one another along boundaries extending parallel to the axis of rotation of said discs;

alternate ones of said segments being composed of ferromagnetic material possessing neutral magnetostrictive properties, between which neutral segments lie other sebments each having three separate areas composed of ferromagnetic material respectively exihibiting positive, neutral and negative magnetosrtictive properties.

10. The combination of claim 9 in which any selected one of said other band segments is made up of individual areas respectively possessing positive and negative magnetostrictive properties separated by an area possessing neutral magnetotrictive properties;

all three areas of each of the said other band segments being disposed side-by-side in a direction parallel to the axis of rotation of said discs;

the order of appearance of the individual areas of successive ones of said other band segments, considered circumferentially of said discs, being reversed insofar as their particular magnetostrictive properties are concerned;

whereby individual areas of ferromagnetic material possessing any one particular magnetostrictive property line in spaced-apart relation around the periphery of each of said discs, and with those areas of said band which exhibit positive magnetostrictive properties alternating in their occurence with those areas of said band which exhibit negative magnetostrictive properties.

References Cited by the Examiner

UNITED STATES PATENTS 2,365,073  12/1944  Haight _____ 73—136
3,198,956  8/1965   James _____ 307—88

FOREIGN PATENTS 442,441  2/1936  Great Britain.

RICHARD C. QUEISSER, *Primary Examiner.*

C. A. RUEHL, *Assistant Examiner.*